United States Patent
Nishikawa et al.

(10) Patent No.: US 7,508,605 B2
(45) Date of Patent: Mar. 24, 2009

(54) ZOOM LENS UNIT AND IMAGE PICKUP DEVICE

(75) Inventors: Masayuki Nishikawa, Higashiosaka (JP); Hideaki Fujita, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/712,072

(22) Filed: Feb. 27, 2007

(65) Prior Publication Data
US 2007/0201152 A1 Aug. 30, 2007

(30) Foreign Application Priority Data
Feb. 27, 2006 (JP) .............................. 2006-049548

(51) Int. Cl.
G02B 15/14 (2006.01)
G02B 7/02 (2006.01)
(52) U.S. Cl. ................. 359/819; 359/822; 359/823; 359/694
(58) Field of Classification Search ................. 359/694, 359/695, 702, 703, 819, 822, 823
See application file for complete search history.

(56) References Cited
U.S. PATENT DOCUMENTS
6,324,019 B1  11/2001  Takanashi et al.
6,599,035 B2 *  7/2003  Ichinokawa ................. 369/349

FOREIGN PATENT DOCUMENTS
JP  2005-77714  3/2005
JP  2005-077714 *  3/2005

* cited by examiner

Primary Examiner—William C Choi
Assistant Examiner—Jack Dinh
(74) Attorney, Agent, or Firm—Edwards Angell Palmer & Dodge LLP; David G. Conlin; David A. Tucker

(57) ABSTRACT

There is provided a zoom lens unit excellent in shock resistance and space-saving. Second, third lens holders 29, 30 have shaft holes, into which shafts 27, 28 are inserted, so as to be movable in an optical axis direction. By first, second helical springs 31, 32 fitted to the shafts 27, 28, the second lens holder 29 is biased to a wall member 18 provided on a subject side, and the third lens holder 30 is biased to a wall member 19 provided on an image pickup element 12 side. As the power is turned off, the second lens holder 29 moves toward the subject side and, upon contact with the wall member 18, is stopped, while the third lens holder 30 moves toward the image pickup element 12 side and, upon contact with the wall member 19, is stopped.

8 Claims, 8 Drawing Sheets

OPTICAL AXIS DIRECTION

ZOOM LENS UNIT AND IMAGE PICKUP DEVICE

This nonprovisional application claims priority under 35 U.S.C. §119(a) on Patent Application No. 2006-049548 filed in Japan on Feb. 27, 2006, the entire contents of which are hereby incorporated by reference.

BACKGROUND OF THE INVENTION

The present invention relates to a zoom lens unit being small in size and having shock resistance, as well as to an image pickup device using the same.

Conventionally, for zoom lenses as an example, there have been proposed various types of lens driving units for driving two or more lens groups along an optical axis direction. FIG. 9 is a perspective view of a zoom lens unit disclosed in JP 2005-77714 A as an example of the lens driving unit. It is noted that in the future, a Z direction is headed toward an image pickup element side, while a −Z direction is headed toward a subject side.

The zoom lens unit shown in FIG. 9 has a first lens holder 3 for holding a first lens group 1 and a second lens holder 4 for holding a second lens group 2, where the first lens holder 3 is composed of a first frame 5 and a second frame 6. The first frame 5 of the first lens holder 3 and the second lens holder 4 are guided in an optical axis direction (Z direction) by a first guide shaft 7. Also, the second frame 6 of the first lens holder 3 and the second lens holder 4 are guided in the optical axis direction by a second guide shaft 8. In this way, the first lens holder 3 and the second lens holder 4 can be moved in the optical axis direction along the two guide shafts 7, 8.

The second frame 6 of the first lens holder 3 and the second lens holder 4 can be moved in the optical axis direction along a recess of a cam 9, in which the recess is formed along the rotational direction of the cam (not shown). In this connection, the first lens holder 3 and the second lens holder 4 are biased in mutually approaching directions by a bias spring 10 so as to be connected to each other. Then, the first lens holder 3 and the second lens holder 4, which are brought into close contact with the recess of the cam 9 by the biasing force of the bias spring 10, and driven in the optical axis direction by rotation of the cam 9.

However, the conventional zoom lens unit disclosed in JP 2005-77714 A has problems as shown below.

That is, the bias spring 10 provided for bringing the first lens holder 3 and the second lens holder 4 into close contact with the recess of the cam 9 is fitted to side faces of the first lens holder 3 and the second lens holder 4.

Nowadays, there is a growing trend that the zoom lens unit is mounted even on small-size terminal equipment, and the lens and the holder are going smaller in size and thinner in the thickness in the optical axis direction. Besides, those are formed from resin for easiness of configurational fabrication. Accordingly, in the case where the bias spring 10 is fitted to the side faces of the lens holders 3, 4 as in the conventional zoom lens unit, the lens holders 3, 4 are pressed against the guide shafts 7, 8 by the bias spring 10, so that the guide shafts 7, 8 serve as a restraining part to cause the lens holders 3, 4 to be flexed in the optical axis direction, giving influences on the optical characteristics, disadvantageously.

It would be possible to form the first lens holder 3 and the second lens holder 4 into a configuration with considerations given to the occurrence of the flexure. However, if the two lens holders 3, 4 are held in a normally loaded state, there would occur creeps or plastic deformation to the resin from which the lens holders 3, 4 are made, causing performance deteriorations as another problem.

Further, fitting the above-described bias spring to the small lens holders in small-size equipment would cause the assemblability to degrade. Moreover, for small-size equipment, it is impossible to allow a large space for the fitting of the bias spring to the two lens holders, so that the fitting portion of the bias spring cannot be made strong. As a result, there is another problem that the bias spring is more liable to fall off upon application of an impact.

SUMMARY OF THE INVENTION

Accordingly, an object of the present invention is to provide a zoom lens unit which is excellent in shock resistance and space-saving, as well as an image pickup device using the zoom lens unit.

In order to achieve the above object, there is provided a zoom lens unit comprising:

a second lens group and a third lens group arrayed concentrically and in series in this order as from a subject side;

a first shaft positioned so as to extend along an optical axis direction of the second lens group and the third lens group;

a second shaft positioned so as to extend along the optical axis direction;

a first wall member and a second wall member for supporting both ends of each of the first shaft and the second shaft, respectively;

a second lens holder on which the second lens group is mounted and which has a shaft hole for insertion of the first shaft therethrough, the second lens holder being movable in the optical axis direction under guidance of the first shaft;

a third lens holder on which the third lens group is mounted and which has a shaft hole for insertion of the second shaft therethrough, the third lens holder being movable in the optical axis direction under guidance of the second shaft; and a biasing part for biasing the second lens holder and the third lens holder in such directions as the first and third lens holders are distanced from each other.

According to the above structure, the second lens holder and the third lens holder are normally biased in mutually separating directions by the biasing part. Therefore, in the case where an impact acceleration is applied to the zoom lens unit, even upon occurrence of a collision between the second, third lens holders, the impact upon the collision is relaxed by the biasing force of the biasing part.

A zoom lens unit of an embodiment further comprises a driving part for driving the second lens holder and the third lens holder in the optical axis direction against biasing force of the biasing part or using biasing force of the biasing part, and for, in a power-off state, moving the second lens holder by using biasing force of the biasing part until the second lens holder reaches either one of the first wall member and the second wall member while moving the third lens holder until the third lens holder reaches the other of the first wall member and the second wall member.

In this embodiment, in the power-off state, the second, third lens holders are moved by the driving part and the biasing part until the second and third lens holders reach the first, second wall members that support both ends of each of the first, second shafts, and moreover the second, third lens holders are held as they are by the biasing force of the biasing part. Therefore, the two lens holders can be brought and held in contact with the two wall members, so that loads to be applied on the two lens holders and the driving part are partly borne by the two wall members. Thus, the load applied directly to the two lens holders and the driving part can be reduced.

Further, in the power-off state, since the two lens holders are brought into contact with the two wall members, the distance between the second lens holder and the third lens holder is maximized. Therefore, even if the zoom lens unit has undergone an impact, the occurrence of collision between the two lens holders can be prevented.

In an embodiment, the biasing part is composed of at least two biasing parts, first biasing part and second biasing part, and wherein the first biasing part biases the second lens holder from an image pickup side toward a subject side, and the second biasing part biases the third lens holder from the subject side toward the image pickup side.

In this embodiment, since the second lens holder and the third lens holder are biased by exclusive biasing parts, respectively, the lens holders can be moved to the wall members reliably and smoothly.

In an embodiment, the biasing part is an elastic body.

In an embodiment, the elastic body is a helical spring.

In this embodiment, the biasing part can be provided simply with low price, and moreover operated reliably.

An embodiment further comprises a shaft positioned so as to extend along the optical axis direction, wherein the helical spring is wound around the shaft.

In this embodiment, since the helical spring is wound around the shaft, the helical spring is enabled to impart biasing force to the two lens holders reliably. Further, the helical spring can be prevented from falling off.

In an embodiment, the shaft comprises the first shaft for guiding the second lens holder in the optical axis direction and the second shaft for guiding the third lens holder in the optical axis direction.

In this embodiment, the helical spring as the biasing part biases the periphery of the shaft hole, into which the first shaft is inserted, in the second lens holder, and the periphery of the shaft hole, into which the second shaft is inserted, in the third lens holder. Therefore, the two lens holders are never pressed against the two shafts by the helical spring, the occurrence that the two shafts serve as restraining parts to cause flexures of the two lens holders in the optical axis direction and give influences on the optical characteristics of the two lens groups can be prevented.

Further, in the power-off state, in the case where the two lens holders are moved to the two wall members so as to be held by the biasing force of the helical spring, portions on which loads are normally applied are the peripheries of the shaft holes in the two lens holders. Therefore, addition of any stress to the two lens groups as well as deformation of the two lens holders with respect to the optical axis can be prevented.

Furthermore, the helical spring can be placed within a moving range of the two lens holders, and the biasing part for biasing the two lens holders can be provided with a space saving. Thus, a small-size zoom lens unit can be implemented.

An image pickup device of this invention includes the zoom lens unit.

According to the above structure, since a space-saving zoom lens unit of high shock resistance is included, there can be provided the image pickup device which is small in size and excellent in shock resistance.

As apparent from the above description, in the zoom lens unit of the present invention, the second lens holder and the third lens holder are biased by the biasing part in their mutually separating directions. Therefore, even if the zoom lens unit has undergone an impact so that the first, third lens holders have collided with each other, the impact upon the collision can be relaxed by the biasing force of the biasing part.

That is, according to the present invention, there can be provided a zoom lens unit which is excellent in shock resistance.

Further, in the power-off state, if the second, third lens holders are moved by the driving part and the biasing part until the first and third lens holders reach the first, second wall members that support both ends of each of the first, second shafts, and moreover the first, third lens holders are held as they are by the biasing force of the biasing part, then the two lens holders can be held in contact with the two wall members, so that loads applied on the two lens holders and the driving part can be reduced.

Moreover, in the power-off state, since the two lens holders are put into contact with the two wall members, the distance between the two lens holders is maximized. Therefore, even if the zoom lens unit has undergone an impact, the occurrence of collision between the two lens holders can be prevented.

Also, in the case where the biasing part is implemented by helical springs wound around the first shaft for guiding the second lens holder in the optical axis direction and around the second shaft for guiding the third lens holder in the optical axis direction, respectively, portions biased by the helical springs can be set to peripheries of the shaft holes in which the two shafts are inserted in the two lens holders. Therefore, the two lens holders are never pressed against the two shafts by the helical springs, and the occurrence that the two shafts serve as restraining parts to cause flexures of the two lens holders in the optical axis direction and give influences on the optical characteristics of the two lens groups can be prevented.

Further, even in the case where the two lens holders are moved to the two wall members so as to be held by the biasing force of the helical springs in the power-off state, addition of any stress to the two lens groups as well as deformation of the two lens holders can be prevented.

Consequently, according to the present invention, there can be provided a zoom lens unit which is excellent in shock resistance and space-saving.

Also, since the image pickup device of the present invention includes a zoom lens unit which is excellent in shock resistance and space-saving, the image pickup device is small in size and excellent in shock resistance.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
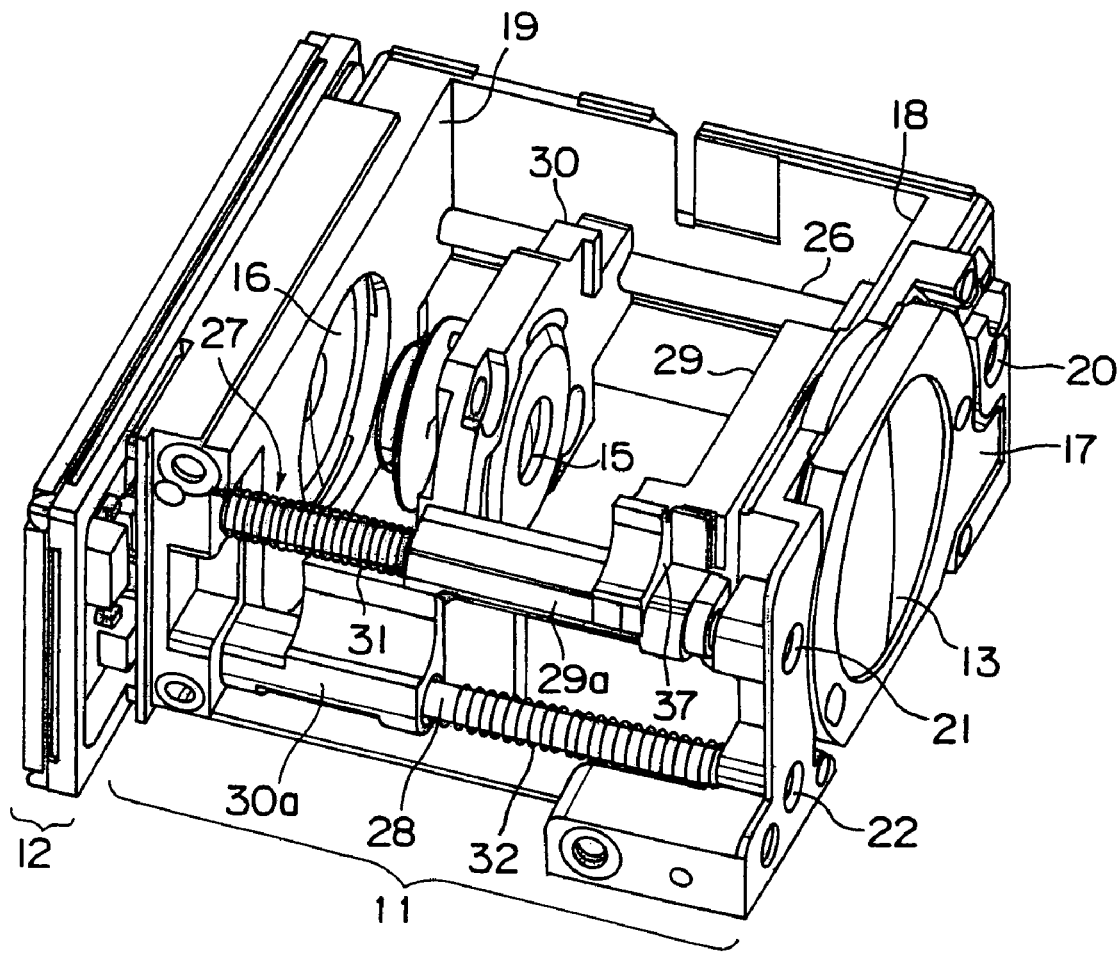
FIG. 1 is a perspective view of an image pickup device including a zoom lens unit of the present invention.
Figure 1:
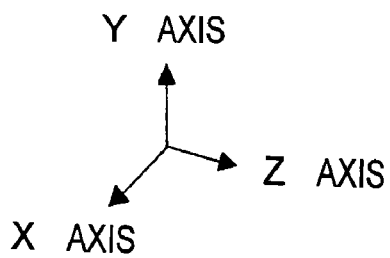
Figure 2:
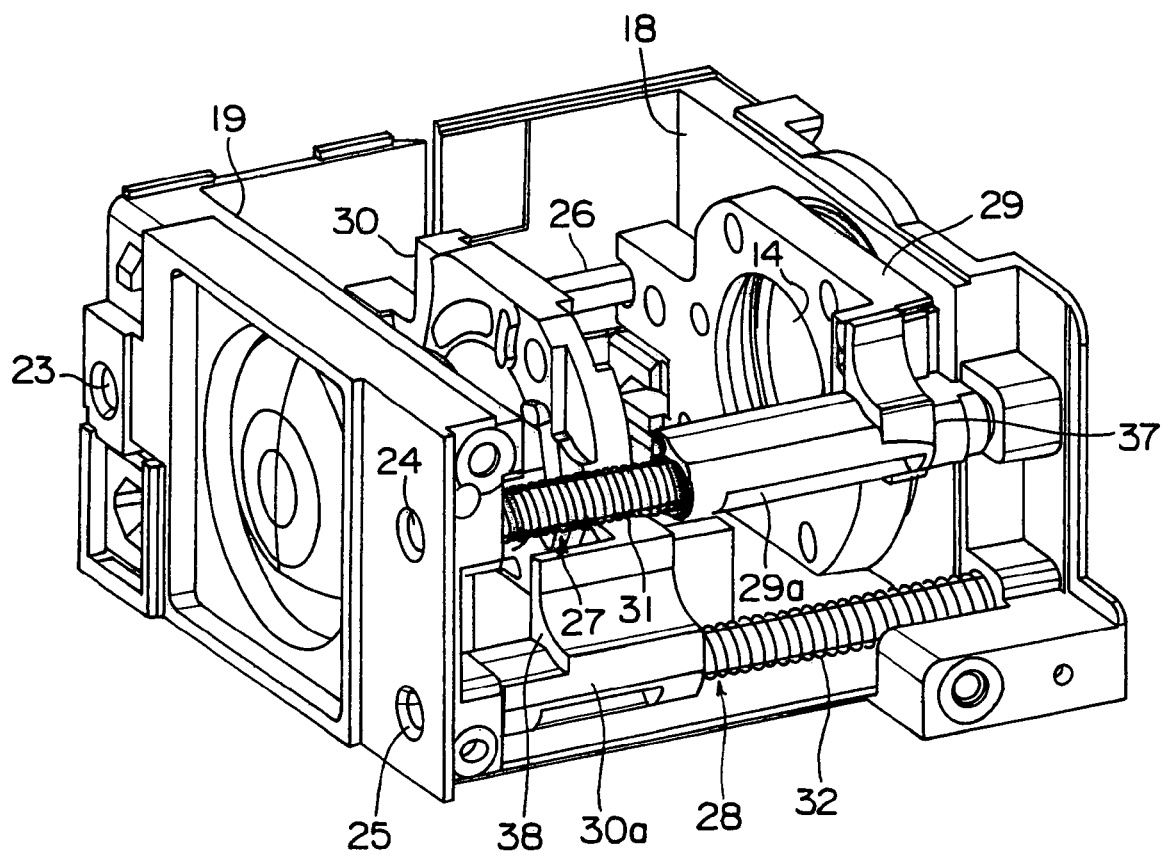
FIG. 2 is a perspective view in which an image pickup element is omitted from the state of FIG. 1, as viewed in another direction.

Hereinbelow, the present invention will be described in detail by way of embodiments thereof illustrated in the accompanying drawings. FIG. 1 is a perspective view of an image pickup device including a zoom lens unit according to this embodiment. It is noted here that a Z axis direction is assumed as an optical axis direction, while X axis and Y axis directions are assumed as directions in which a plane parallel to an image pickup surface extends. The image pickup surface is set on an image pickup element 12. Also, FIG. 2 is a perspective view in which the image pickup element 12 is omitted from the state of FIG. 1, as viewed in another direction.

The image pickup device is composed roughly of a zoom lens unit 11 and the image pickup element 12 mounted on one side of the zoom lens unit 11 on its one side opposite to the subject side. Then, the zoom lens unit 11 has an outer configuration of a generally rectangular parallelepiped with its one XZ plane and one YZ plane eliminated, where planes other than the eliminated planes are connected to one another in generally vertical directions.

In the zoom lens unit 11, a first lens group 13, a second lens group 14 (see FIG. 2), a third lens group 15 and a fourth lens group 16 are disposed in the optical axis direction so as to be parallel to one XY plane. In an optical system in this zoom lens unit 11, zoom scaling and focusing can be implemented by move of the second lens group 14 and the third lens group 15 in the optical axis direction. Further, a first lens holder 17 supports the first lens group 13. The first lens holder 17 and the fourth lens group 16 are fixed to two wall members 18, 19, respectively, which are parallel to the XY plane that is vertical to the optical axis of the zoom lens unit 11.

The wall member 18 has three through holes 20, 21, 22, while the wall member 19 has three through holes 23, 24, 25 (see FIG. 2), where a line passing through centers of the through holes 20, 23, a line passing through centers of the through holes 21, 24 and a line passing through centers of the through holes 22, 25 extend in the optical axis direction so as to be parallel to one another. Both ends of a shaft 26 are inserted into the through holes 20, 23, both ends of a shaft 27 are inserted into the through holes 21, 24, and both ends of a shaft 28 are inserted into the through holes 22, 25, where the shafts 26, 27, 28 extend in the optical axis direction so as to be generally parallel to one another.

A second lens holder 29 supports the second lens group 14, and a protrusion member 29a of the second lens holder 29 has a shaft hole formed along the optical axis of the second lens group 14 so as to extend through the protrusion member 29a. Also, a third lens holder 30 supports the third lens group 15, and a protrusion member 30a of the third lens holder 30 has a shaft hole formed along the optical axis of the third lens group 15 so as to extend through the protrusion member 30a.

Then, the shaft 27 is inserted through the shaft hole of the second lens holder 29, and the second lens holder 29 is enabled to move along the shaft 27. Further, the shaft 27 is inserted through a first helical spring 31, and the first helical spring 31 is placed closer to the image pickup element 12 than the second lens holder 29. Thus, the first helical spring 31 biases the protrusion member 29a of the second lens holder 29 toward the subject-side wall member 18.

Furthermore, the shaft 28 is inserted through the shaft hole of the third lens holder 30, and the third lens holder 30 is enabled to move along the shaft 28. The shaft 28 is further inserted through a second helical spring 32, and the second helical spring 32 is placed closer to the subject than the third lens holder 30. Thus, the second helical spring 32 biases the protrusion member 30a of the third lens holder 30 toward the wall member 19 on the image pickup element 12 side.

As shown above, in this embodiment, by the first helical spring 31 and the second helical spring 32 serving as the biasing parts, the second lens holder 29 and the third lens holder 30 are normally biased in such directions as to be distanced from each other. Accordingly, with an impact acceleration applied to the image pickup device, in the event of collision between the second and third lens holders 29, 30, the impact upon the collision is relaxed by the biasing forces of the first, second helical springs 31, 32.

The shaft 26 positioned along the Z-axis direction is inserted through guide recesses formed in the second lens holder 29 and the third lens holder 30, thus preventing the second lens holder 29 and the third lens holder 30 from rotating within the XY plane.

Figure 3A:
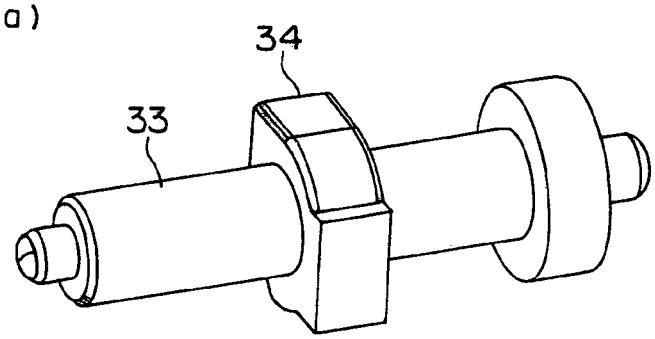
FIGS. 3(a) and 3(b) are schematic views of a drive mechanism for moving a second lens holder and a third lens holder of FIG. 1 in the optical axis direction.
Figure 3B:
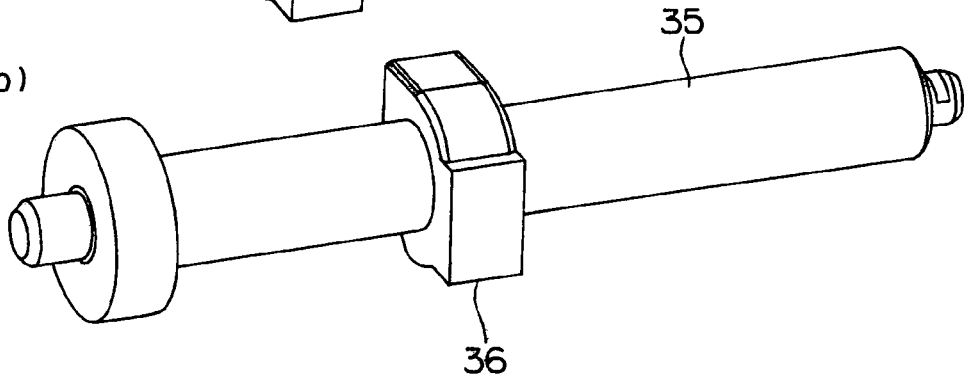
Figure 3B:

FIGS. 3(a) and 3(b) are schematic views of a drive mechanism for moving the second lens holder 29 and the third lens holder 30 in the optical axis direction. A first lead screw 33 positioned along the optical axis direction is screwed with a first nut 34, and the first nut 34 is enabled to move along the optical axis direction as the first lead screw 33 is rotated. Similarly, a second lead screw 35 positioned along the optical axis direction is screwed with a second nut 36, and the second nut 36 is enabled to move along the optical axis direction as the second lead screw 35 is rotated. It is noted that threaded portions of the first lead screw 33 and the second lead screw 35 are omitted in FIGS. 3(a) and 3(b). Also, although not shown in the figures, the two lead screws 33, 35 are driven into rotation by a stepping motor or the like.

Figure 4:
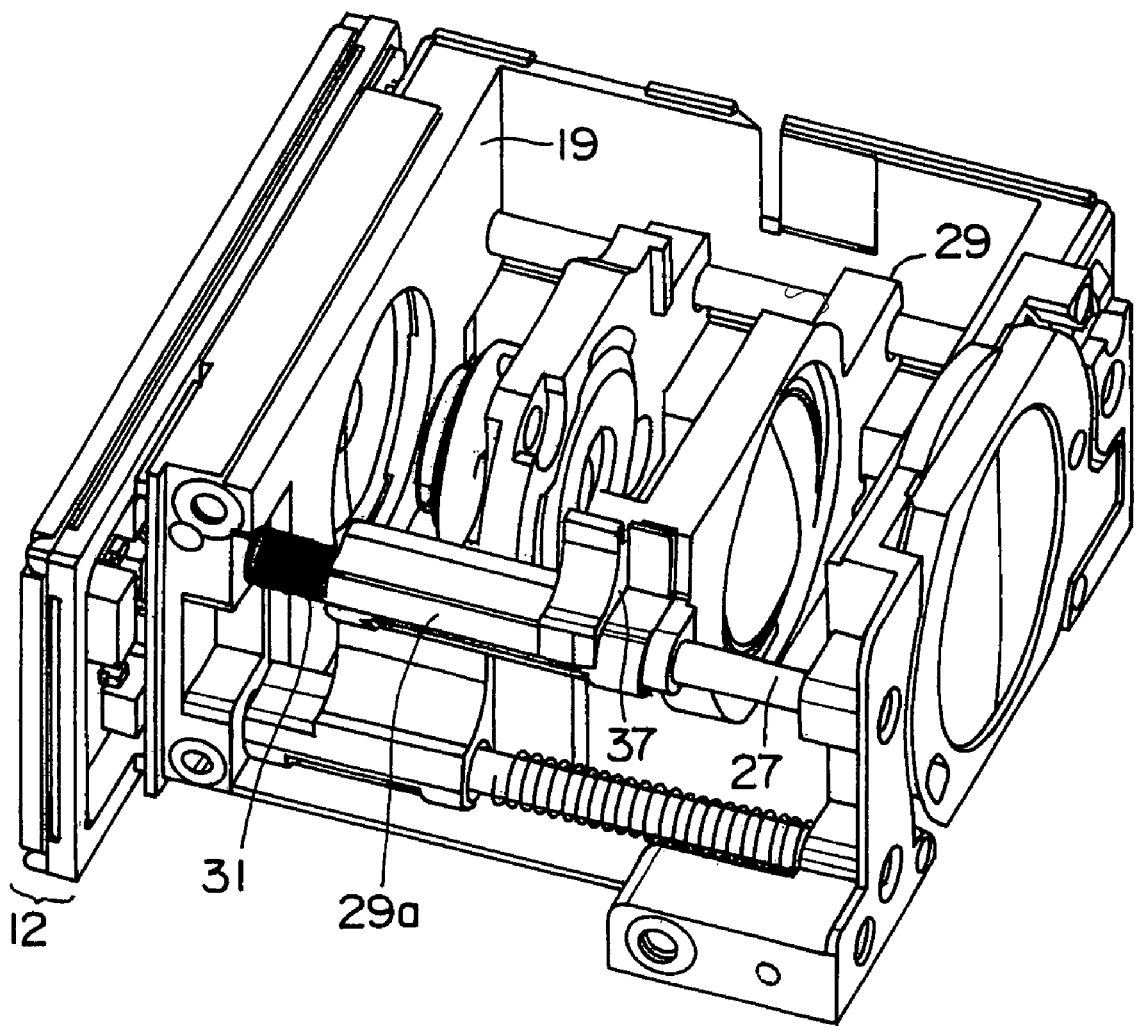
FIG. 4 is a view showing a state that the second lens holder has been moved toward the image pickup element side.

A flat surface 37 vertical to the optical axis is provided in a neighborhood of the shaft hole in the second lens holder 29 (see FIG. 1), and the first nut 34 is enabled to make contact with the flat surface 37. Then, as described above, as the first lead screw 33 rotates so that the first nut 34 moves in the optical axis direction toward the image pickup element 12, a surface of the first nut 34 on the image pickup element 12 side comes into contact with the flat surface 37 of the second lens holder 29. Further, as the first lead screw 33 is rotated, the second lens holder 29 moves along the shaft 27 in the optical axis direction against the biasing force of the first helical spring 31. It is noted that FIG. 4 shows a state that the second lens holder 29 has been moved toward the image pickup element 12 side by the first nut 34. The first lead screw 33 and the first nut 34 do not appear in FIGS. 1, 2 and 4.

While the second lens holder 29 is moving in the optical axis direction against the biasing force of the first helical spring 31 as shown above, the first helical spring 31 is compressed between the protrusion member 29a of the second lens holder 29 and the wall member 19. Therefore, backlashes between the first nut 34 and the first lead screw 33 can be eliminated by the biasing force of the first helical spring 31. Also, the first helical spring 31 presses the protrusion member 29a, which is the thickest portion in the second lens holder 29 in terms of the thickness toward the optical axis direction and has the shaft hole into which the shaft 27 is inserted, so that the biasing force can be applied to the vicinity of the shaft hole in the second lens holder 29. Therefore, the second lens holder 29 is never pressed against the shaft 27 by the first helical spring 31, thus preventing the occurrence that the shaft 27 serves as a restraining part to cause a flexure of the second lens holder 29 in the optical axis direction and give influences on the optical characteristics of the second lens group 14. Further, the first helical spring 31, which is inserted into the shaft 27, is kept from the fear for fall-off. Besides, the first helical spring 31 can easily be fitted to the shaft 27, hence being convenient in terms of assemblability.

Figure 5:
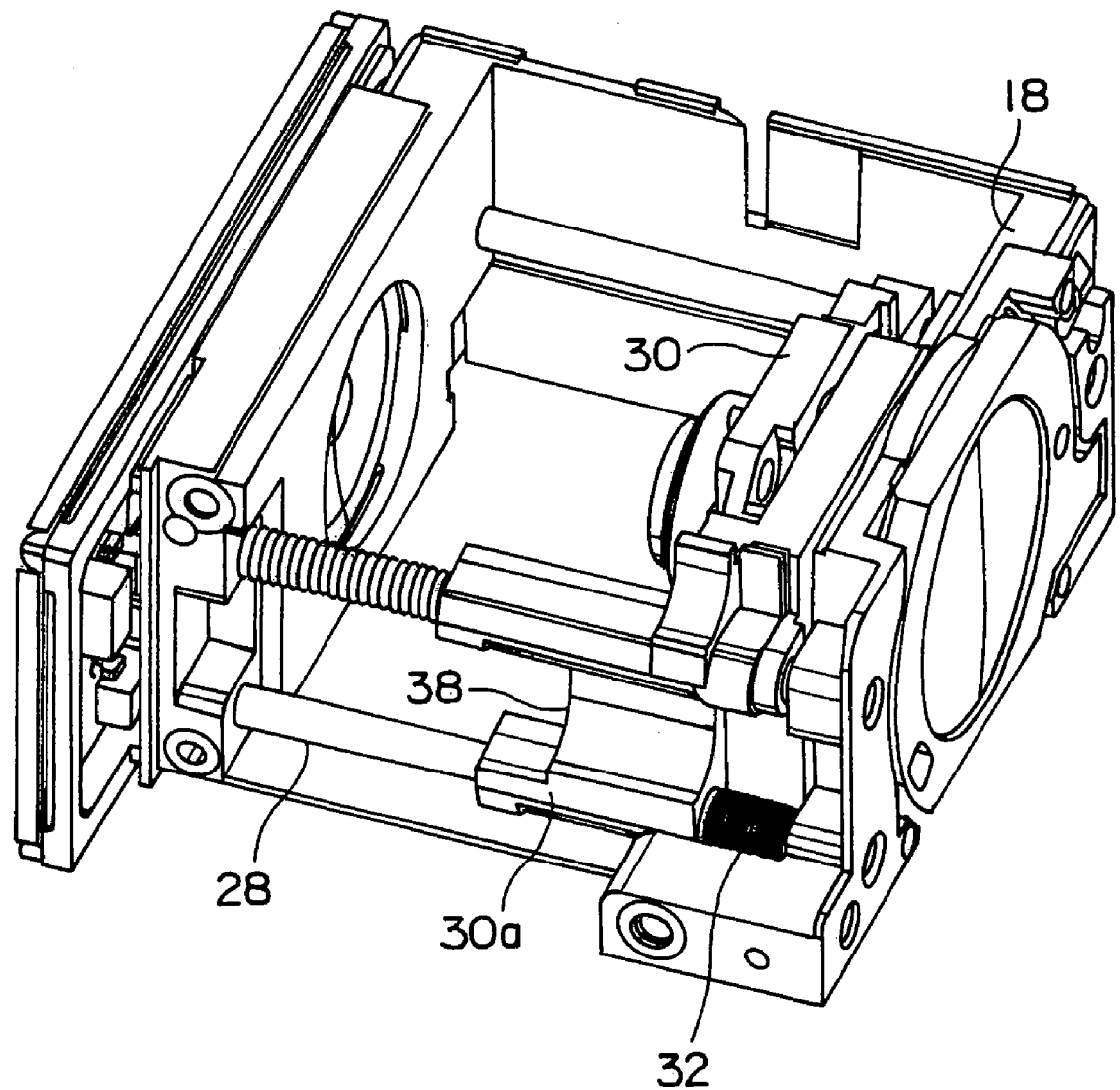
FIG. 5 is a view showing a state that the third lens holder has been moved toward the subject side.

A flat surface 38 vertical to the optical axis is provided in a neighborhood of the shaft hole of the third lens holder 30 (see FIG. 2), and the second nut 36 is enabled to make contact with the flat surface 38. Then, as described above, as the second lead screw 35 rotates so that the second nut 36 moves in the optical axis direction toward the subject, a surface of the second nut 36 on the subject side comes into contact with the flat surface 38 of the third lens holder 30. Further, as the second lead screw 35 is rotated, the third lens holder 30 moves along the shaft 28 in the optical axis direction against the biasing force of the second helical spring 32. It is noted that FIG. 5 shows a state that the third lens holder 30 has been moved toward the subject side by the second nut 36. The second lead screw 35 and the second nut 36 do not appear in FIGS. 1, 2 and 5.

While the third lens holder 30 is moving in the optical axis direction against the biasing force of the second helical spring 32 as shown above, the second helical spring 32 is compressed between the protrusion member 30a of the third lens holder 30 and the wall member 18. Therefore, backlashes between the second nut 36 and the second lead screw 35 can be eliminated by the biasing force of the second helical spring 32. Also, the second helical spring 32 presses the protrusion member 30a, which is the thickest portion in the third lens holder 30 in terms of the thickness toward the optical axis direction and has the shaft hole into which the shaft 28 is inserted, so that the biasing force can be applied to the vicinity of the shaft hole in the third lens holder 30. Therefore, the third lens holder 30 is never pressed against the shaft 28 by the second helical spring 32, thus preventing the occurrence that the shaft 28 serves as a restraining part to cause a flexure of the third lens holder 30 in the optical axis direction and give influences on the optical characteristics of the third lens group 15. Further, the second helical spring 32, which is fitted to the shaft 28, is kept from the fear for fall-off. Besides, the second helical spring 32 can easily be fitted to the shaft 28, hence being convenient in terms of assemblability.

Figure 6:
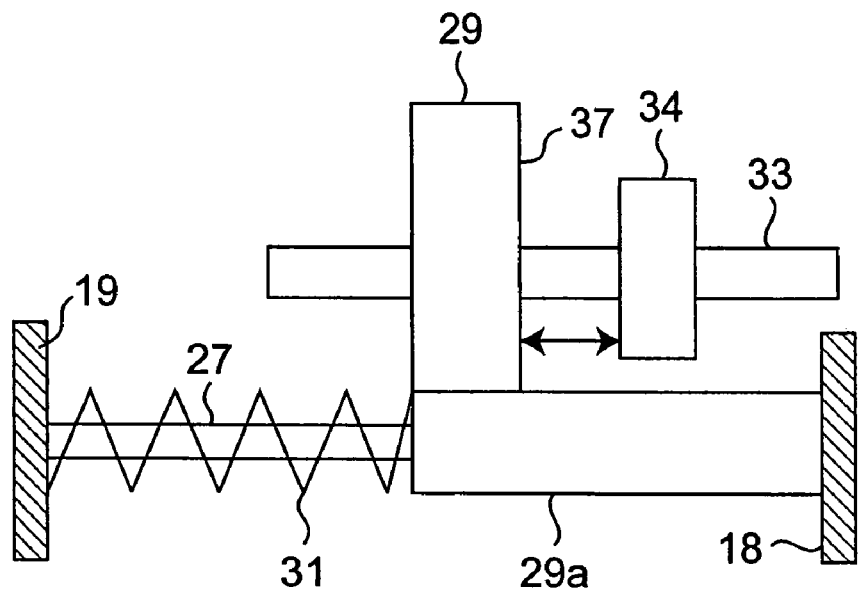
FIG. 6 is a view showing a positional relationship among a plane of the second lens holder, a first nut and a wall member.

Next, an explanation will be given on the zoom lens unit 11 in its power-off state or storage state. FIG. 6 is a view showing a positional relationship among the flat surface 37 of the second lens holder 29, the first nut 34 and the wall member 18. Referring to FIG. 6, as the power is turned off upon an end of image taking, the first nut 34 moves toward the subject side while the second lens holder 29 is moved along therewith by the biasing force of the first helical spring 31. Then, when the protrusion member 29a comes into contact with the wall member 18, the second lens holder 29 is stopped. On the other hand, the first nut 34 keeps moving, and when separated away from the flat surface 37 of the second lens holder 29, the first nut 34 is stopped. In the meantime, the second lens holder 29 keeps biased toward the subject side by the first helical spring 31 so as to be pressed against the wall member 18. In this connection, since the protrusion member 29a having the shaft hole into which the shaft 27 is inserted is the portion that is normally loaded, there hardly occurs addition of any stress to the second lens group 14 or deformation of the second lens holder 29 with respect to the optical axis. As a result of this, it becomes implementable to maintain the optical characteris-tics. Further, since there is no application of any load to the first nut 34 via the second lens holder 29, the occurrence of a so-called bite of the first nut 34 into the first lead screw 33 upon application of an impact can be prevented.

Figure 7:
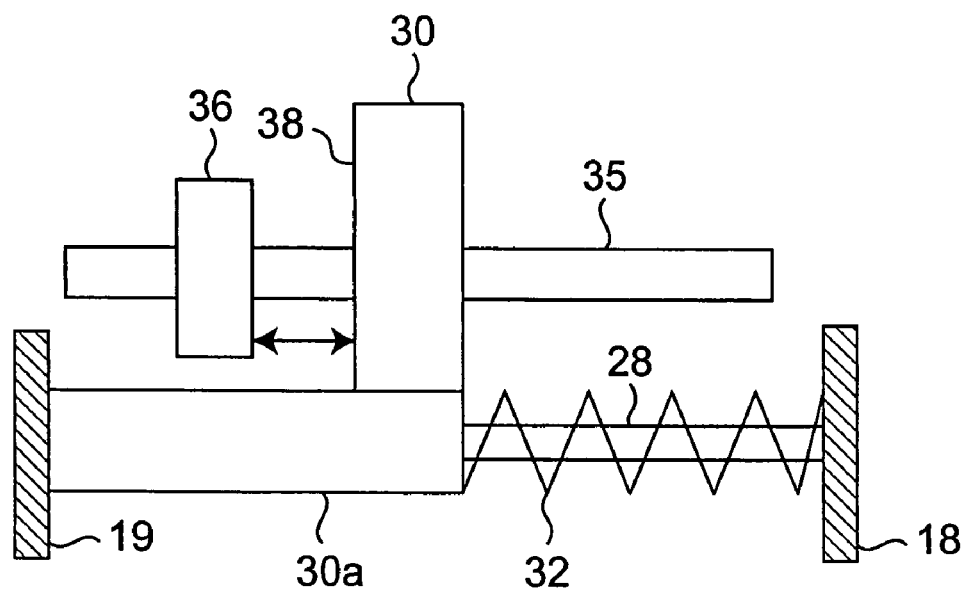
FIG. 7 is a view showing a positional relationship among a plane of the third lens holder, a second nut and a wall member.

FIG. 7 shows a positional relationship among the flat surface 38 of the third lens holder 30, the second nut 36 and the wall member 19. Referring to FIG. 7, as the power is turned off upon an end of image taking, the second nut 36 moves toward the image pickup element 12 (see FIG. 1) side while the third lens holder 30 is moved along therewith by the biasing force of the second helical spring 32. Then, when the protrusion member 30a comes into contact with the wall member 19, the third lens holder 30 is stopped. On the other hand, the second nut 36 keeps moving, and when separated away from the flat surface 38 of the third lens holder 30, the second nut 36 is stopped. In the meantime, the third lens holder 30 keeps biased toward the image pickup element 12 side by the second helical spring 32 so as to be pressed against the wall member 19. In this connection, since the protrusion member 30a having the shaft hole into which the shaft 28 is inserted is the portion that is normally loaded, there hardly occurs addition of any stress to the third lens group 15 or deformation of the third lens holder 30 with respect to the optical axis. As a result of this, it becomes implementable to maintain the optical characteristics. Further, since there is no application of any load to the second nut 36 via the third lens holder 30, the occurrence of a so-called bite of the second nut 36 into the second lead screw 35 upon application of an impact can be prevented.

In the foregoing embodiment, the first helical spring 31 exclusively for biasing the second lens holder 29 toward the subject side, and the second helical spring 32 exclusively for biasing the third lens holder 30 toward the image pickup element 12 side, are provided in a separate placement. However, this is not limitative for the present invention.

Figure 8:
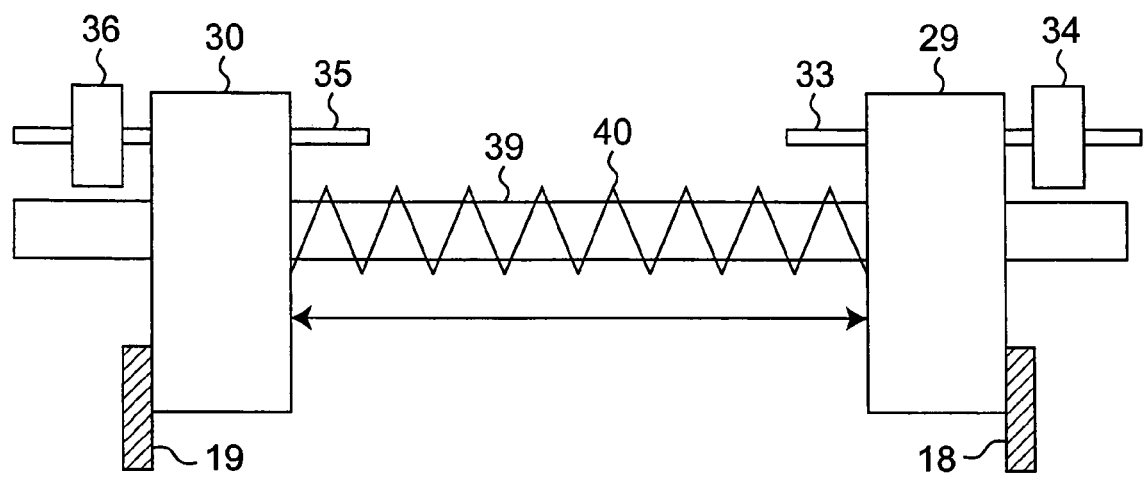
FIG. 8 is a view showing a makeup of a helical spring different from those of FIGS. 6 and 7.
Figure 9:
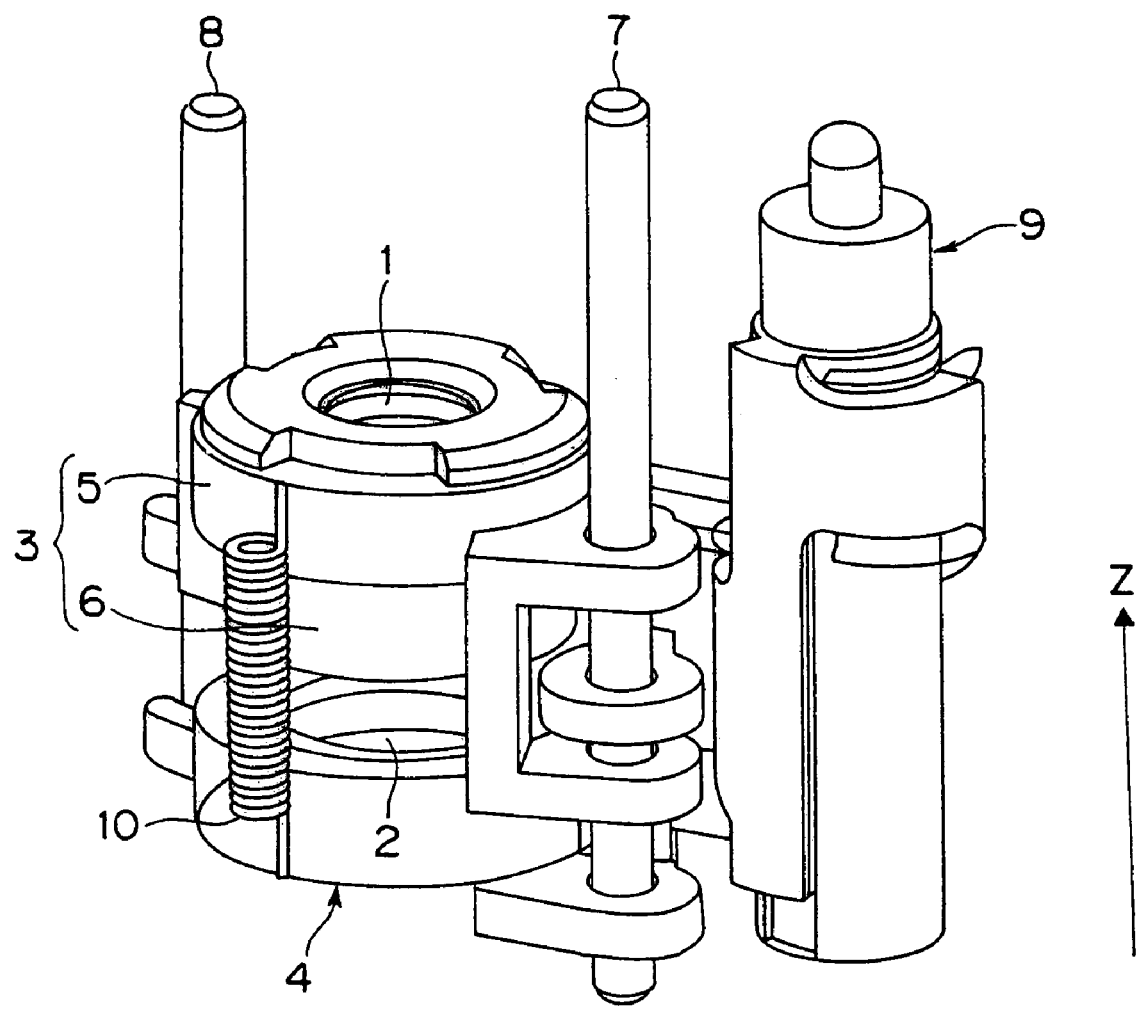
FIG. 9 is a perspective view of a zoom lens unit of a prior art.

For instance, as shown in FIG. 8, a shaft 39 is inserted into a second lens holder 29 and a third lens holder 30 in common so as to extend in the optical axis direction. Between the second lens holder 29 and the third lens holder 30 on this shaft 39, a helical spring 40 is inserted to make a biasing force exerted on the two lens holders 29, 30 so that the second lens holder 29 and the third lens holder 30 are separated away from each other. Then, when the power is turned off so that the first nut 34 and the second nut 36 are moved backward, the helical spring 40 is enabled to bias the two lens holders 29, 30 until those make contact with the wall members 18, 19.

Thus, the helical spring for returning the two lens holders 29, 30 to the optical axis direction, as well as the shaft for supporting the helical spring, can be reduced to one in number.

The present invention is not limited to the foregoing embodiment, and may be modified in various ways within the scope defined by appended claims. Also, embodiments of the invention obtained by combining the individual technical means disclosed in the embodiment one with another as required are included in the technical scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A zoom lens unit comprising:
a second lens group and a third lens group arrayed concentrically and in series in this order as from a subject side;

a first shaft positioned so as to extend along an optical axis direction of the second lens group and the third lens group;

a second shaft positioned so as to extend along the optical axis direction;

a first wall member and a second wall member for supporting both ends of each of the first shaft and the second shaft, respectively;

a second lens holder on which the second lens group is mounted and which has a shaft hole for insertion of the first shaft therethrough, the second lens holder being movable in the optical axis direction under guidance of the first shaft;

a third lens holder on which the third lens group is mounted and which has a shaft hole for insertion of the second shaft therethrough, the third lens holder being movable in the optical axis direction under guidance of the second shaft; and a biasing part for biasing the second lens holder and the third lens holder in directions such that the second and third lens holders are urged away from each other.

2. The zoom lens unit as claimed in claim 1, further comprising a driving part for driving the second lens holder and the third lens holder in the optical axis direction against biasing force of the biasing part or using biasing force of biasing part, and for, in a power-off state, moving the second lens holder by using biasing force of the biasing part until the second lens holder reaches either one of the first wall member or the second wall member while moving the third lens holder until the third lens holder reaches the other of the first wall member and the second wall member.

3. The zoom lens unit as claimed in claim 1, wherein the biasing part is composed of at least two biasing parts, first biasing part and second biasing part, and wherein the first biasing part biases the second lens holder from an image pickup side toward a subject side, and the second biasing part biases the third lens holder from the subject side toward the image pickup side.

4. The zoom lens unit as claimed in claim 1, wherein the biasing part includes at least one elastic body.

5. The zoom lens unit as claimed in claim 4, wherein each of said at least one elastic body is a helical spring.

6. The zoom lens unit as claimed in claim 5, wherein a first helical spring is wound around said first shaft and a second helical spring is wound around said second shaft, said first and second helical springs being positioned so as to extend along the optical axis direction.

7. The zoom lens unit as claimed in claim 6, wherein said first shaft comprises a first shaft for guiding the second lens holder in the optical axis direction and said second shaft comprises a shaft for guiding the third lens holder in the optical axis direction.

8. An image pickup device which included the zoom lens unit as defined in claim 1.

* * * * *